(12) United States Patent
Wang

(10) Patent No.: US 9,138,900 B2
(45) Date of Patent: Sep. 22, 2015

(54) TRANSPORT FOR MATERIAL PICKING UP AND PLACING

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Hong-Qi Wang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/518,751

(22) Filed: Oct. 20, 2014

(65) Prior Publication Data

US 2015/0151436 A1   Jun. 4, 2015

(30) Foreign Application Priority Data

Nov. 29, 2013  (CN) .......................... 2013 1 0619552

(51) Int. Cl.
   *B25J 15/06*  (2006.01)

(52) U.S. Cl.
   CPC .......... *B25J 15/0675* (2013.01); *B25J 15/0633* (2013.01)

(58) Field of Classification Search
   USPC .......... 294/183, 192, 186, 188, 189, 65, 86.4, 294/907; 414/749.5, 416.01, 416.02, 752.1; 198/468.3; 901/40; 29/741, 742, 743
   See application file for complete search history.

(56) References Cited

U.S. PATENT DOCUMENTS

| | | | | |
|---|---|---|---|---|
| 3,702,698 A * | 11/1972 | Schwebel | ...................... | 294/188 |
| 3,834,558 A * | 9/1974 | Bru | ............................... | 294/186 |
| 3,973,682 A * | 8/1976 | Neff | .............................. | 294/186 |
| 4,995,662 A * | 2/1991 | Hawkswell | ................... | 294/188 |
| 5,201,875 A * | 4/1993 | Tessier et al. | .................. | 294/192 |
| 5,308,132 A * | 5/1994 | Kirby et al. | ................... | 294/185 |
| 6,592,325 B2 * | 7/2003 | Lu et al. | ..................... | 414/752.1 |
| 7,426,781 B2 * | 9/2008 | Burger | .......................... | 294/183 |
| 8,430,439 B2 * | 4/2013 | Tsai et al. | ..................... | 294/186 |

* cited by examiner

*Primary Examiner* — Paul T Chin
(74) *Attorney, Agent, or Firm* — Novak Druce Connolly Bove + Quigg LLP

(57) ABSTRACT

A transport configured to cooperate with a mechanical arm to pick up and place rubber plugs, includes a housing, a piston assembly received in the housing and a pickup assembly. The pickup assembly includes a guide base and a pickup member. The guide base defines a second receiving cavity. The housing also defines a first receiving cavity coupling with the second receiving cavity. A first tracheal joint and a second tracheal joint are provided on the housing. The piston assembly is slidably received in the first receiving cavity and driven by the first tracheal joint. The piston assembly defines a channel coupling with the second tracheal joint. The pickup member includes a connecting portion and an ejection portion inserting through the connecting portion. The connecting portion is received in the second receiving cavity. The ejection portion defines an air vent.

15 Claims, 3 Drawing Sheets

TRANSPORT FOR MATERIAL PICKING UP AND PLACING

FIELD

The subject matter herein generally relates to transports, and in particular to a transport to pick up and place small rubber plugs.

BACKGROUND

A transport is configured to place rubber plugs in the holes of the workpiece. The transport includes a cylinder mounted to a mechanical arm, a piston assembly coupled to the cylinder, a rod coupled to the piston assembly, and a suction nozzle coupled to the rod. Another end of the suction nozzle is coupled to an air supply. When transporting a rubber plug, the cylinder drives the piston assembly, and the piston assembly presses the suction nozzle to the rubber plug. The air supply controls the suction nozzle to suction to the rubber plug. Then, the mechanical arm drives the transport to place the rubber plug in the holes of the workstation.

BRIEF DESCRIPTION OF THE DRAWINGS

Implementations of the present technology will now be described, by way of example only, with reference to the attached figures.

DETAILED DESCRIPTION

Figure 1:
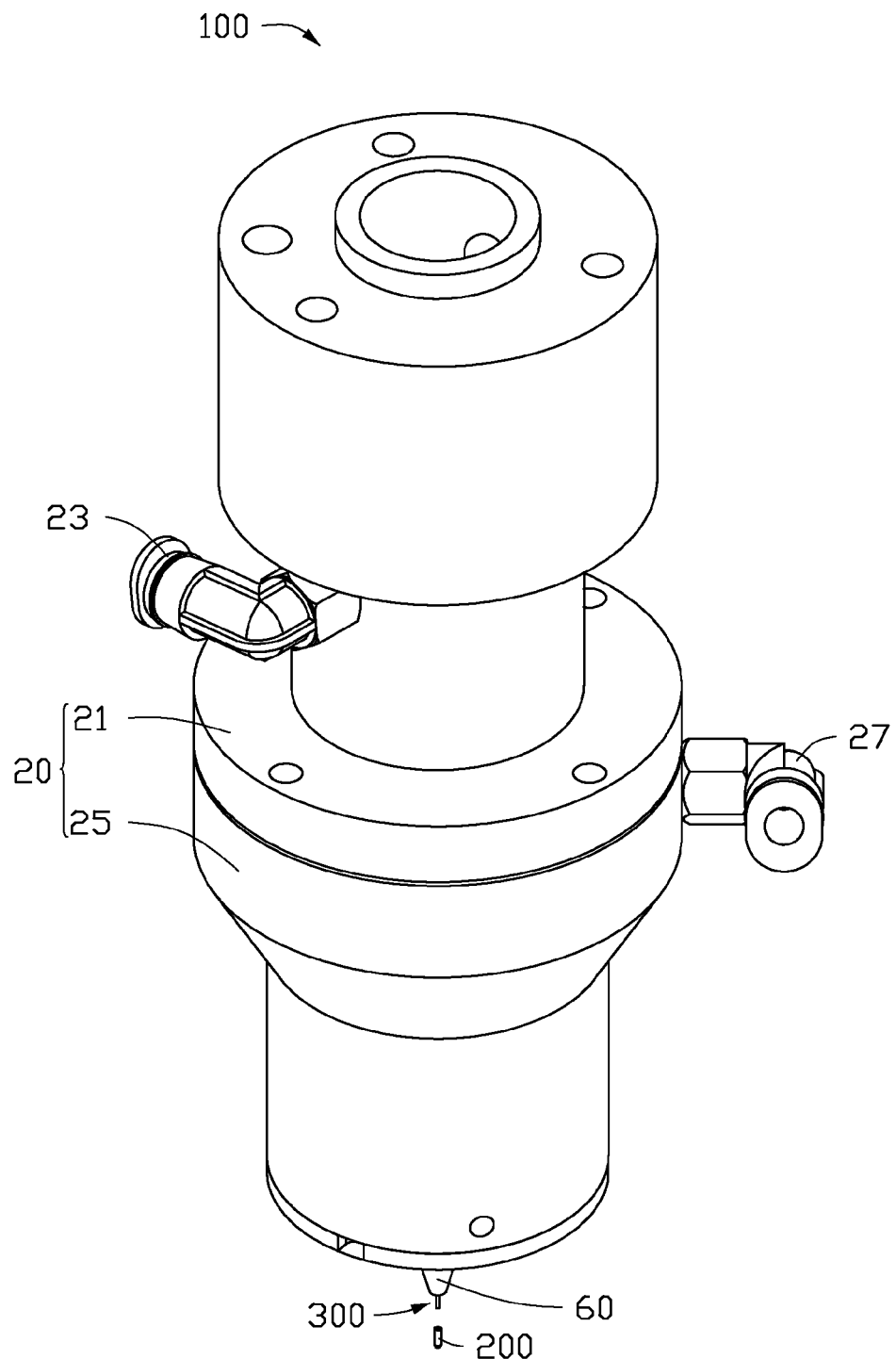
FIG. 1 is a perspective view of an embodiment of a transport.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "comprising," when utilized, means "including, but not necessarily limited to"; it specifically indicates open-ended inclusion or membership in the so-described combination, group, series and the like.

FIG. 1 illustrates an embodiment of a transport 100. The transport 100 can be configured to cooperate with a mechanical arm (not shown) to pick up and place a rubber plug in a hole of a workpiece (not shown). The transport 100 can include a housing 20 and a pickup assembly 60 mounted to the housing 20.

The housing 20 can include a first housing 21, a first tracheal joint 23, a second housing 25, and a second tracheal joint 27. One end of the first housing 21 can be coupled to the mechanical arm, and the other end of the first housing 21 can be coupled to the second housing 25. One end of the first tracheal joint 23 can be coupled to an air supply (not shown), and the other end of the first tracheal joint 23 can be coupled to the first housing 21. One end of the second tracheal joint 27 can be coupled to the air supply, and the other end of the second tracheal joint 27 can be coupled to the second housing 25.

Figure 2:
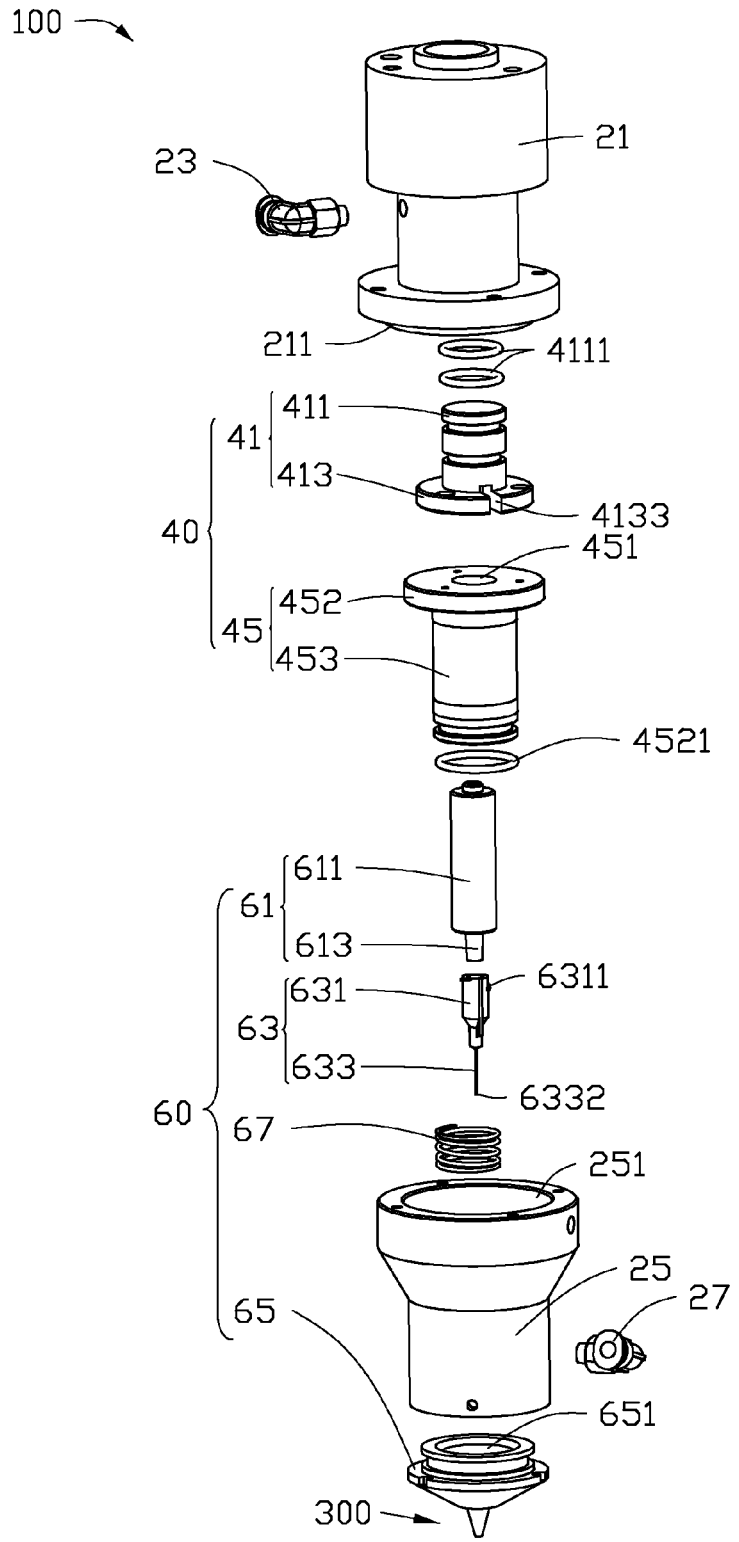
FIG. 2 is an exploded, perspective view of the transport of the FIG. 1.

FIG. 2 illustrates the transport 100 can further include a piston assembly 40. The piston assembly 40 can be slidable and received in the housing 20. The end of the first housing 21 coupled to the second housing 25 can form a connecting portion 211. The second housing 25 can be mounted to the connecting portion 211, and can define a first through vent 251.

The piston assembly 40 can include a first piston assembly 41 and a second piston assembly 45 coupled to the first piston assembly 41.

The first piston assembly 41 can include a first main body 411, and a first flange 413 coupled to one end of the first main body 411. A plurality of sealing members 4111 can be arranged with the first main body 411. The sealing members 4111 can seal the first main body 411 and an inner wall of the first housing 21. One end of the first flange 413 away from the first main body 411 can define a groove 4133 along a radial direction.

The second piston assembly 45 can include a stepped vent 451, a second flange 452, and a second main body 453 formed from one side of the second flange 452. The stepped vent 451 can pass through the second flange 452 and the second main body 453. The second flange 452 can be coupled to the first flange 413. A plurality of sealing members 4521 can be arranged with the second main body 453. The sealing members 4521 can seal the second main body 453 and an inner wall of the second housing 25.

The pickup assembly 60 can couple to the second housing 25 and the second piston assembly 45, and can include a sealing base 61, a pickup member 63, a guide base 65, and an elastic member 67.

The sealing base 61 can be received in the stepped vent 451, and include a third main body 611 and an extending portion 613.

The pickup member 63 can include a connecting portion 631 arranged with the extending portion 613; the extending portion 613 can include an ejection portion 633 inserted in the connecting portion 631. An outside wall of the connecting portion 631 can include a screw thread 6311, and the connecting portion 631 can be hermetically sealed to the inside wall of the second main body 453 by the screw thread 6311. The ejection portion 633 can be configured to pick up and place the rubber plug 200, and can define an air vent 6332. In one embodiment, the ejection portion 633 can be needle shaped.

The guide base 65 can be coupled to the second housing 25, and can define a receiving cavity 651. The receiving cavity 651 can be configured to partly receive the connecting portion 631 and the ejection portion 633. The ejection portion 633 can pass through the guide base 65, and the second piston assembly 45 can drive the ejection portion 633 to reach outside 300 of the receiving cavity 651. The ejection portion 633 can pick up the rubber plug 200. Then, the ejection portion 633 can retract into the receiving cavity 651, and the guide base 65 can resist against the rubber plug 200. The ejection portion 633 can place the rubber plug 200 in the hole of the workpiece.

The elastic member 67 can be arranged with the pickup member 63 and be received in the receiving cavity 651. One end of the elastic member 67 can resist against the guide base 65, and the other end of the elastic member 67 can resist against the second main body 453. The elastic member 67 can be configured to avoid a collision and damaging the second main body 453 and the guide base 65.

Figure 3:
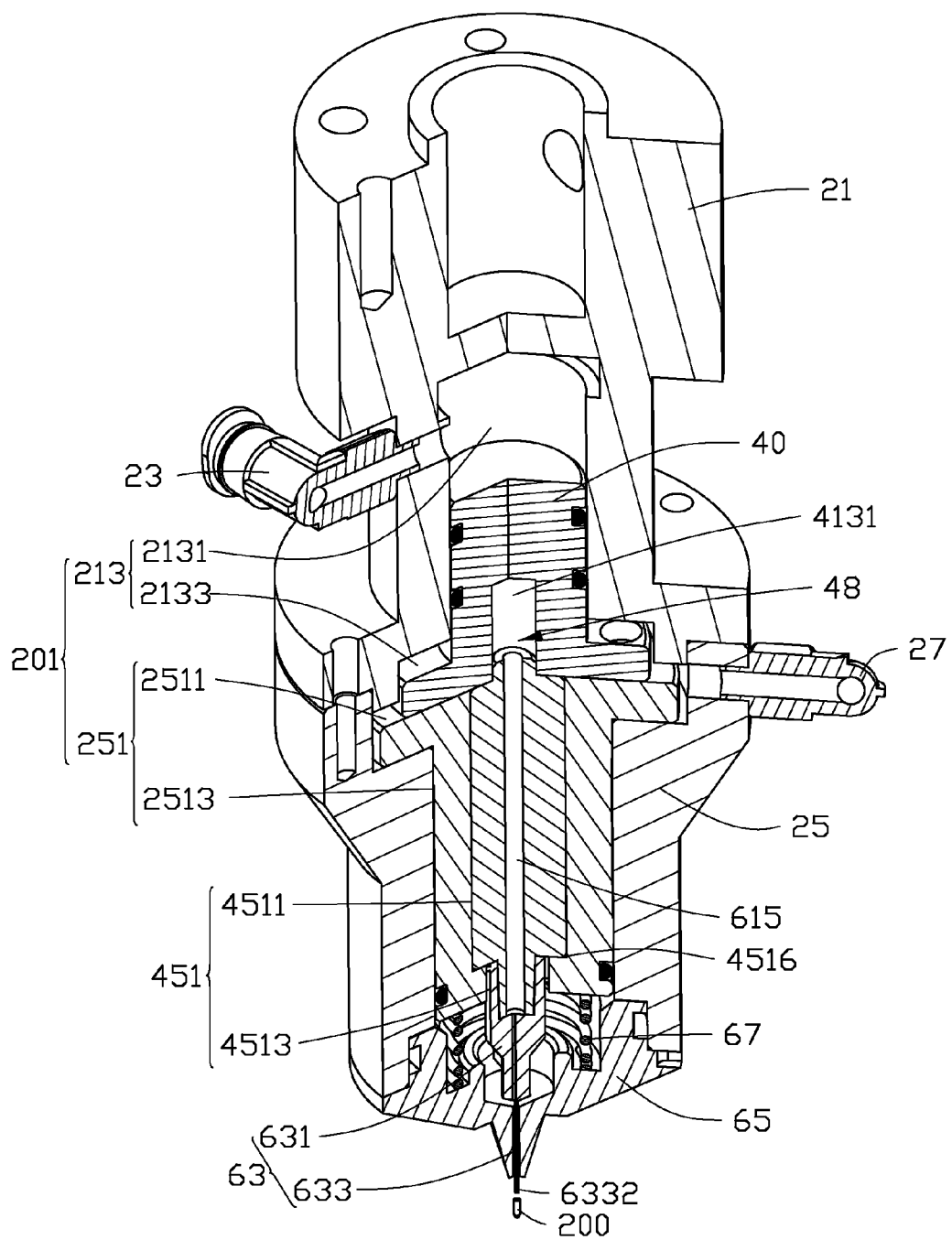
FIG. 3 is a cross-sectional view of the transport of the FIG. 1.

FIG. 3 illustrates the housing 20 can define a receiving cavity 201, and the receiving cavity 201 can receive the piston assembly 40. The connecting portion 211 (see FIG. 2) can define a first blind vent 213. In one embodiment, the first blind vent 213 can be a stepped shape, and can include a first receiving vent 2131 away from the connecting portion 211, and a second receiving vent 2133 through the connecting portion 211. A size of the first receiving vent 2131 can be smaller than the size of the second receiving vent 2133. The first tracheal joint 23 can be coupled to the first receiving vent 2131. The air can be supplied into or extracted from the first blind vent 213 through the first tracheal joint 23 to move the piston assembly 40.

The first through vent 251 can be coupled to the first blind vent 213 to form the receiving cavity 201. In one embodiment, the first through vent 251 can be stepped shape, and can include a third receiving vent 2511 coupled to the second receiving vent 2133, and a fourth receiving vent 2513 away from the second receiving vent 2133. A size of the fourth receiving vent 2513 can be smaller than that of the third receiving vent 2511. The second tracheal joint 27 can be coupled to the third receiving vent 2511.

The first piston assembly 41 (see FIG. 2) can be slidably received in the first blind vent 213, and the second piston assembly 45 can be slidably received in the first through vent 251. The piston assembly 40 can define a channel 48, and the channel 48 can be coupled with the first piston assembly 41 and the second piston assembly 45.

The first main body 411 (see FIG. 2) can be slidably received in the first receiving vent 2131. The first flange 413 can be received in the second receiving vent 2133, and can define a second blind vent 4131 away from one end of the first main body 411 along an axial direction. The second blind vent 4131 can couple to the second receiving vent 2133 in the groove 4133.

The second flange 452 (see FIG. 2) can be received in the third receiving vent 2511. The second main body 453 can be slidably received in the fourth receiving vent 2513. The stepped vent 451 can couple to the second blind vent 4131 and the groove 4133 to form the channel 48. The stepped vent 451 can include a fifth receiving vent 4511 coupled to the second blind vent 4131, and a sixth receiving vent 4513 away from the second blind vent 4131. A size of the sixth receiving vent 4513 can be smaller than a size of the fifth receiving vent 4511. A junction of the fifth receiving vent 4511 and the sixth receiving vent 4513 can form a stepped surface 4516.

The third main body 611 (see FIG. 2) can be hermetically received in the fifth receiving vent 4511, and one end of the third main body 611 away from the first flange 413 can resist against the stepped surface 4516. The extending portion 613 can be formed from one end of the third main body 611, and can be received in the sixth receiving vent 4513. The sealing base 61 can define a second through vent 615 passing through the third main body 611 and the extending portion 613. The second through vent 615 can couple with the second blind vent 4131 and the groove 4133.

The connecting portion 631 can be partly received in the sixth receiving vent 4513. The air vent 6332 can couple to the air supply via the second through vent 615, the second blind vent 4131, the groove 4133, and second tracheal joint 27. The receiving cavity 651 can couple to the fourth receiving vent 2513.

In operation, the first housing 21 can be mounted to the mechanical arm, and the mechanical arm can move the transport 100 to the picking position. The ejection portion 633 can be directed at the rubber plug 200. The air supply can supply air to the first tracheal joint 23, and increase the pressure of the first receiving vent 2131. The pressure can move the first piston assembly 41 and the second piston assembly 45 towards the rubber plug 200. The second main body 453 can press the elastic member 67, and the ejection portion 633 can pass through the guide base 65 into the rubber plug 200. The air supply can extract air via the second tracheal joint 27, and the pressure of the groove 4133, the second blind vent 4131, the second through vent 615, and the air vent 6332 can be reduced to create a negative pressure. The negative pressure can allow the ejection portion 633 to steadily suction to the rubber plug 200.

The mechanical arm can move the transport 100 above the hole of the workpiece. The air supply can supply air to the second tracheal joint 27, and the air can pass through the groove 4133, the second blind vent 4131, the second through vent 615, and the air vent 6332 to the rubber plug 200. Then, the air can hold the rubber plug 200, and can stop the rubber plug 200 from moving from a predetermined position when the ejection portion 633 retracts into the receiving cavity 651. The air supply can extract air via the first tracheal joint 23, and the vacuum formed by the extracting air can push the elastic member 67 and the second main body 453. The first piston assembly 41 and the second piston assembly 45 can move away from the guide base 65. The ejection portion 633 can retract into the receiving cavity 651. The guide base 65 can resist against the rubber plug 200, and allow the rubber plug 200 to be placed in the hole of the workpiece.

In one embodiment, the first blind vent 213 and the first through vent 251 can be straight vents, and the first flange 413 and the second flange 452 can be omitted. In one embodiment, the first housing 21 can be integrated with the second housing 25 to form the housing 20. In one embodiment, the first piston assembly 41, the second piston assembly 45, and the sealing base 61 can be integrated to form the piston assembly 40. In one embodiment, the sealing base 61 can be omitted, and the connecting portion 631 can be coupled to the inside wall of the second piston assembly 45 by the screw thread 6311.

The embodiments shown and described above are only examples. Many details are often found in the art such as the other features of a transport 100. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A transport for material picking up and placing configured to cooperate with a mechanical arm to pick up and place rubber plugs comprising:
   a housing having:
      a first receiving cavity,
      a first tracheal joint and a second tracheal joint coupled to the first receiving cavity and an air supply;
   a piston assembly slidably received in the first receiving cavity and having a channel, wherein one end of the channel is coupled to the second tracheal joint and another end of the channel is placed through the piston assembly;
   a pickup assembly having:
      a guide base configured to be coupled to the housing and define a second receiving cavity which is configured to be coupled to the first receiving cavity,
      a pickup member having:
         a connecting portion configured to be received in the second receiving cavity and hermetically sealed to piston assembly,
         an ejection portion configured to be inserted in the connecting portion and define an air vent coupled to the channel;
   wherein the piston assembly moves in the first receiving cavity and the second receiving cavity when air is supplied through the first tracheal joint, and the ejection portion reaches outside of the second receiving cavity such that the ejection portion is capable of inserting into the rubber plug, and the channel further creates a negative pressure when air is extracted through the second tracheal joint, such that the ejection portion is capable of steadily holding the rubber plug and the rubber plug is thus capable of being picked up;
   wherein the ejection portion retracts into the guide base when air is extracted through the first tracheal joint, and the guide base resists against the rubber plug, such that the rubber plug is ejected outside of the second receiving cavity, and the channel further creates a positive pressure when air is supplied through the second tracheal joint, and the positive pressure is capable of allowing the ejection portion to release the rubber plug and place the rubber plug.

2. The transport as claimed in claim 1, wherein:
   the housing comprises a first housing and a second housing;
   one end of the first housing couples to the second housing, and the other end of the first housing couples to the mechanical arm;
   the first housing defines a first blind vent adjacent to the second housing; and
   the second housing defines a first through vent, and the first through vent couples to the first blind vent to form the first receiving cavity.

3. The transport as claimed in claim 2, wherein:
   the guide base is coupled to one end of the second housing away from the first housing; and
   the first tracheal joint is coupled to the first housing, and the second tracheal joint is coupled to the second housing.

4. The transport as claimed in claim 2, wherein:
   the piston assembly comprises a first piston assembly and a second piston assembly coupled to the first piston assembly; and
   the first piston assembly is received in the first blind vent, and the second piston assembly is received in the first through vent.

5. The transport as claimed in claim 4, wherein:
   the first blind vent is step-shaped, and comprises a first receiving vent away from the second housing, and a second receiving vent adjacent to the second housing; and
   a size of the first receiving vent is smaller than a size of the second receiving vent.

6. The transport as claimed in claim 5, wherein:
   the first piston assembly comprises a first main body, and a first flange coupled to one end of the first main body;
   the first main body is slidably received in the first receiving vent, and the first flange is received in the second receiving vent; and
   the first flange defines a second blind vent away from one end of the first main body along an axial direction, and defines a groove along a radial direction.

7. The transport as claimed in claim 6, wherein a plurality of sealing members are arranged to the first main body, the sealing members seal the first main body and an inner wall of the first housing.

8. The transport as claimed in claim 6, wherein the first through vent is step-shaped, and comprises a third receiving vent coupled to the second receiving vent, and a fourth receiving vent away from the second receiving vent, and a size of the fourth receiving vent is smaller than a size of the third receiving vent.

9. The transport as claimed in claim 8, wherein:
   the second piston assembly comprises a second flange, and a second main body formed from one side of the second flange; and
   the second flange is slidably received in the third receiving vent and is coupled to the first flange, and the second main body is slidably received in the fourth receiving vent.

10. The transport as claimed in claim 9, wherein a plurality of sealing members are arranged to the second main body, the sealing members seal the second main body and an inner wall of the second housing.

11. The transport as claimed in claim 9, wherein the second piston assembly further comprises a stepped vent, and the stepped vent couples to the second blind vent and the groove to form the channel.

12. The transport as claimed in claim 11, wherein the stepped vent comprises a fifth receiving vent coupled to the second blind vent, and a sixth receiving vent away from the second blind vent, a size of the sixth receiving vent is smaller than a size of the fifth receiving vent.

13. The transport as claimed in claim 12, wherein:
   the pickup assembly further comprises a sealing base;
   the sealing base comprises a third main body hermetically received in the fifth receiving vent and an extending portion received in the sixth receiving vent; and
   the pickup member is mounted to the extending portion.

14. The transport as claimed in claim 13, wherein:
   the sealing base defines a second through vent, and the second through vent couples with the second blind vent and the groove; and
   the connecting portion is arranged to the extending portion, and defines a screw thread to hermetically seal to the inside wall of the second main body.

15. The transport as claimed in claim 12, wherein:
   the pickup assembly further comprises an elastic member received in the second receiving cavity, the elastic member is arranged to the pickup member; and
   one end of the elastic member resists against the guide base, and the other end of the elastic member resists against the second main body.

* * * * *